(12) United States Patent
Smith et al.

(10) Patent No.: US 6,407,331 B1
(45) Date of Patent: Jun. 18, 2002

(54) PRESSURE RELIEF PANEL FOR ARC RESISTANT CABINETS

(75) Inventors: James E. Smith; Brad R. Leccia, both of Bethel Park, PA (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/813,686

(22) Filed: Mar. 21, 2001

(51) Int. Cl.[7] ................................................. H05K 5/00
(52) U.S. Cl. ..................... 174/50; 174/17 VA; 361/676; 218/157
(58) Field of Search .................. 174/50, 17 VA, 174/17 R, 58, 16.1; 361/676, 600, 605, 606, 607, 608; 218/157; 220/3.2; 312/236, 265.5, 265.6, 213; 248/672

(56) References Cited

U.S. PATENT DOCUMENTS

| | | | | |
|---|---|---|---|---|
| 2,258,150 A | * | 10/1941 | Scott, Jr. ..................... | 361/606 |
| 4,133,021 A | * | 1/1979 | King et al. .................. | 361/365 |
| 5,574,624 A | * | 11/1996 | Renni et al. ................. | 361/676 |
| 5,689,097 A | * | 11/1997 | Aufermann et al. ........ | 361/676 |
| 5,710,402 A | * | 1/1998 | Karnbach et al. ........... | 361/676 |
| 5,767,440 A | * | 6/1998 | Byron et al. ............. | 174/17 VA |
| 5,773,755 A | * | 6/1998 | Iwatare ................... | 174/17 VA |
| 5,878,905 A | * | 3/1999 | Gronbach et al. ...... | 174/17 VA |

* cited by examiner

Primary Examiner—Dean A. Reichard
Assistant Examiner—Angel R. Estrada
(74) Attorney, Agent, or Firm—Martin J. Moran

(57) ABSTRACT

A panel, preferably a ceiling panel, for an arc resistant cabinet defines at least one flap dimensioned and configured to bend outward in response to excessive pressure within the cabinet. The flap is bent into a position wherein it will direct high temperature, expanding gases exiting the cabinet away from areas where personnel are likely to be located. The panel also includes a frame below the flap, thereby permitting the entire panel, including the flap, to support the weight of people working on top of the cabinet.

14 Claims, 6 Drawing Sheets

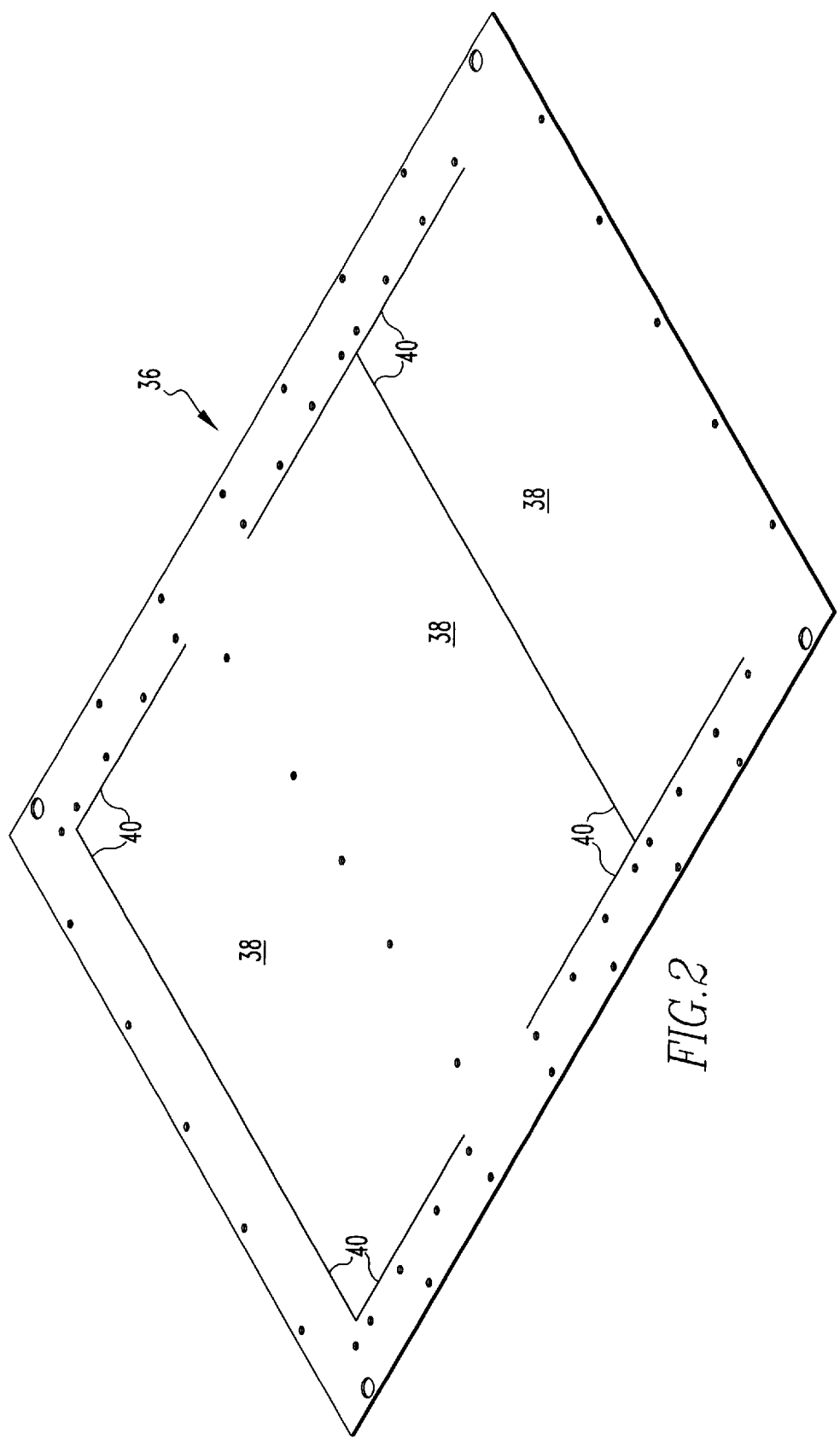

PRESSURE RELIEF PANEL FOR ARC RESISTANT CABINETS

BACKGROUND OF THE INVENTION

1. Field of the Invention

The present invention relates to arc resistant cabinets for electrical equipment. More specifically, the invention relates to a panel defining a flap adapted to support weight from above, and to open in response to excessive pressure within the cabinet, thereby directing gases away from personnel.

2. Description of the Related Art

Electrical equipment such as circuit breakers are typically contained within arc resistant cabinets, intended to protect personnel working around the circuit breaker in the event of an electrical arc within the cabinet. Such an electrical arc would cause a sudden pressure increase inside the cabinet and localized overheating.

Presently available arc resistant cabinets typically include a frame having a hinged flap assembly. Such flaps are designed to support the weight of personnel working on top of the cabinet, but to open to relieve pressure inside the cabinet when an arc occurs. However, such gases may be deflected off the ceiling and wall of the room wherein the cabinet is located, down on to personnel working near the cabinet. Current and proposed safety standards require that the temperature of such gases be tested by placing highly flammable cotton indicators at a height of 2 meters around the perimeter of the cabinet, and these cotton indicators must not ignite when an internal arc occurs.

Accordingly, there is a need for an arc resistant cabinet having a means for directing high temperature, expanding gases exiting the cabinet away from locations where personnel are likely to be present. Additionally, there is a need for an arc resistant cabinet having a means for relieving pressure from high temperature, expanding gases while being easier and less expensive to produce than other arc resistant cabinets.

SUMMARY OF THE INVENTION

The preferred embodiment of the present invention is a pressure release panel for use with arc resistant cabinets. Such pressure relief panels are particularly useful for arc resistant cabinets containing electrical equipment, such as circuit breakers.

The pressure relief panel includes at least one flap defined by a plurality of cuts within the panel. Some preferred embodiments include multiple flaps. A support system is secured below each flap, being dimensioned and configured to prevent the flap from bending downward when pressure is applied to the top of the panel. One preferred support system includes a beam extending lengthwise along each cut.

A preferred and suggested method of making such a pressure relief panel includes providing a solid panel, cutting the panel at appropriate locations to define at least one flap, with one preferred cutting method being a laser, and securing the support system below the flaps. A preferred material for the panel is steel, with 14-gauge steel being suggested. Preferred methods of securing the support system below the flaps include bolting and welding the support system in place.

In use, such pressure relief panels will typically form the roof of an arc resistant cabinet, although they may be used at other locations inside the cabinet. Such cabinets are typically used to contain electrical equipment such as circuit breakers. When an arc occurs within a circuit breaker, the result is high pressure, high temperature expanding gases within the cabinet. Relieving the pressure inside the cabinet requires releasing these gases in a direction wherein the gases are not likely to cause injury to personnel working around the cabinet.

During normal operation of the circuit breaker, the flap will remain closed, and the support structure beneath the flap will permit personnel to walk over the panel and flap without causing the flap to collapse. When an electrical arc occurs, the high temperature, expanding gases will apply upward pressure to the pressure relief panels and flaps, causing the flaps to bend outward. The material type and thickness of the pressure relief panel will preferably be selected to ensure that such expanding gases are likely to push the flap into an approximately vertical position. The location of the pressure relief panel on the roof of the arc resistant cabinet, combined with the substantially vertical flaps, direct the expanding gas upward, and away from locations where personnel are likely to be present. The number, size and shape of the flaps can be selected to more specifically direct the flow of expanding gases out of the cabinet so that, by the time the gases reach the ceiling and walls of the room in which the cabinet is located, and are thereby directed back downward, the gases have cooled sufficiently so that they are unlikely to cause serious injury to personnel.

It is therefore an aspect of the present invention to provide a pressure relief panel for use with arc resistant cabinets.

It is another aspect of the present invention to provide a pressure relief panel capable of supporting the weight of personnel standing on the panel.

It is a further aspect of the present invention to provide a pressure relief panel wherein excess pressure underneath the panel will position a flap defined with the panel into an orientation wherein the flap directs expanding gases to locations where personnel are unlikely to be present.

It is another aspect of the present invention to provide a pressure relief panel wherein excess pressure below the panel pushes the flaps defined within the panel into a vertical orientation.

It is a further aspect of the present invention to provide a support structure beneath the flaps defined within a pressure relief panel for resisting downward movement of the flaps.

It is another aspect of the present invention to provide a pressure relief panel for arc resistant cabinets that is simple and inexpensive to manufacture while maintaining or exceeding the effectiveness of other pressure relief systems.

BRIEF DESCRIPTION OF THE DRAWINGS

FIG. 2 is a top isometric view of a ceiling panel for an arc resistant cabinet according to the present invention.

Like reference numbers denote like elements throughout the drawings.

DETAILED DESCRIPTION OF THE PREFERRED EMBODIMENTS

The preferred embodiment of the present invention is a pressure relieving panel. Such a panel is particularly useful for the construction of arc resistant cabinets for electrical equipment, such as those used to contain circuit breakers.

Figure 1:
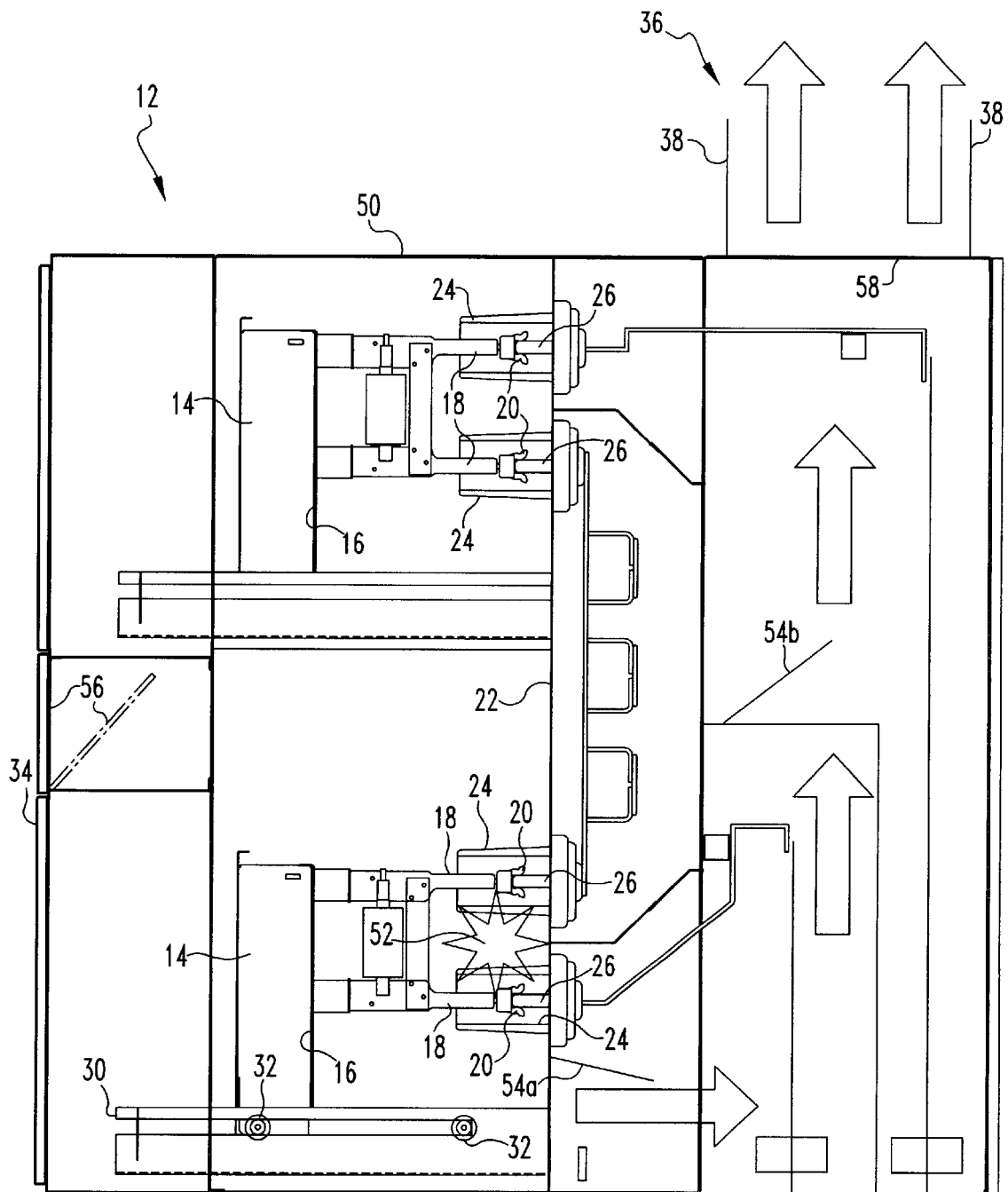
FIG. 1 is a side cross-sectional view of a circuit breaker and arc resistant cabinet according to the present invention, illustrating gas flow at the moment of arcing.
Figure 6:
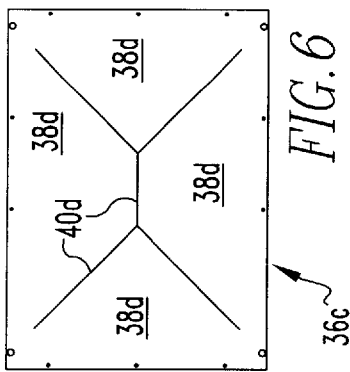
FIG. 6 is a top view of a further embodiment of a ceiling panel for an arc resistant cabinet according to the present invention.
Figure 10:
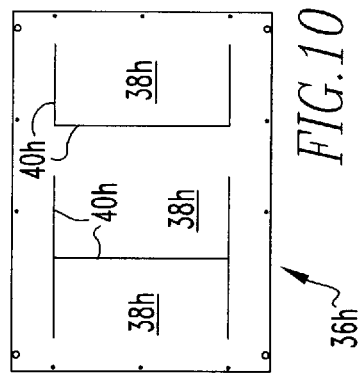
FIG. 10 is a top view of a further embodiment of a ceiling panel for an arc resistant cabinet according to the present invention.
Figure 5:
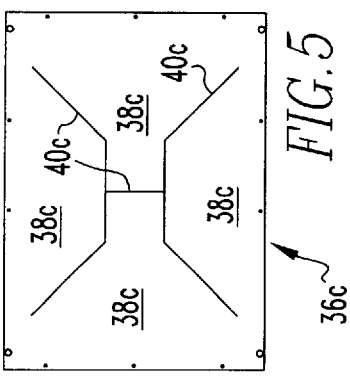
FIG. 5 is a top view of yet another alternative embodiment of a ceiling panel for an arc resistant cabinet according to the present invention.
Figure 9:
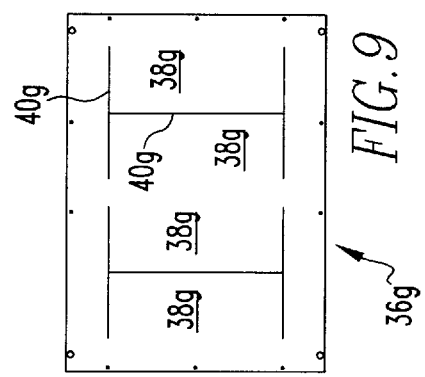
FIG. 9 is a top view of a further embodiment of a ceiling panel for an arc resistant cabinet according to the present invention.
Figure 4:
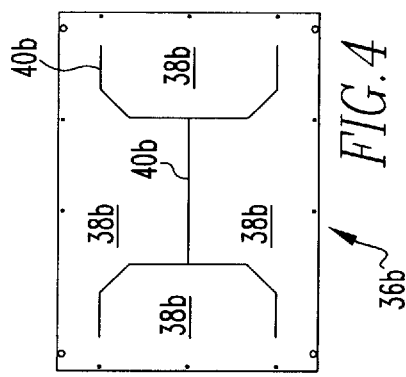
FIG. 4 is a top view of another alternative embodiment of a ceiling panel for an arc resistant cabinet according to the present invention.
Figure 8:
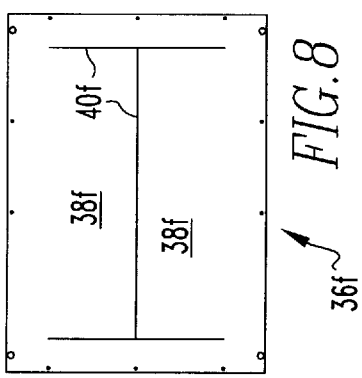
FIG. 8 is a top view of yet another alternative embodiment of a ceiling panel for an arc resistant cabinet according to the present invention.
Figure 3:
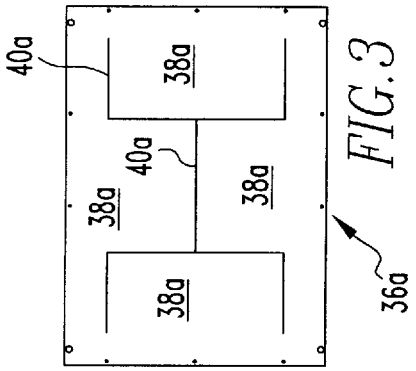
FIG. 3 is a top view of an alternative embodiment of a ceiling panel for an arc resistant cabinet according to the present invention.
Figure 7:
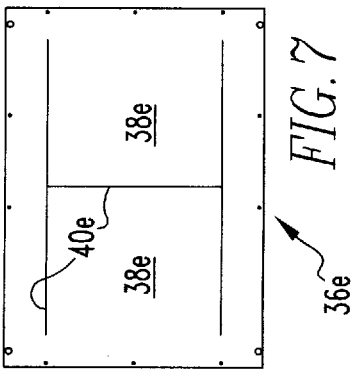
FIG. 7 is a top view of an alternative embodiment of a ceiling panel for an arc resistant cabinet according to the present invention.

A pressure relief panel of the present invention is best understood through and explanation of a conventional medium voltage circuit breaker. Referring to FIG. 1, a switchgear assembly 10 is illustrated. The switchgear 10 includes cabinet 12, having a front compartment 60, middle compartment 62, and rear compartment 64. Front compartment 60 contains a circuit breaker 14. The back 16 of the circuit breaker 14 includes means for electrical connection with a circuit, which are preferably at least one pair of quick disconnects 18, with each quick disconnect 18 terminating with a plurality of contact fingers 20. The cabinet's rear wall 22 includes means for connecting to the means for electrical connection of the circuit breaker to a circuit, which preferably include a pair of channels 24, with each channel 24 containing a primary contact or stab 26. Quick disconnects 18 and contact fingers 20 are dimensioned and configured so that, when the quick disconnects 18 are inserted into the channels 24, the contact fingers 20 are electrically connected to the primary contact or stab 26. A typical medium voltage circuit breaker will include a combination of three pairs of quick disconnects 18 and three corresponding pairs of channels 24. The bottom 28 of circuit breaker 14 may include a plurality of rollers 30, dimensioned and configured to permit the circuit breaker to move along the rails 32, extending from the cabinet's rear 22 to the cabinet's front 34. The levering in assembly typically used to move the circuit breaker from its rearward position wherein the quick disconnect 18 engage the stabs 26, and its forward position wherein the quick disconnect 18 and stabs 26 are disconnected, is well known and therefore not shown. The middle compartment 62 typically contains the supply buses 66, and the rear compartment 64 typically contains the cable connections 68.

If arcing should occur inside the switchgear, the result is a sudden pressure increase and overheating. Materials exposed to the arc may produce hot gases or particles, which must be discharged to the outside of the cabinet 12 to avoid extensive internal damage but in a manner not likely to injure personnel working around the switchgear 10.

Referring to FIG. 2, a pressure relief panel 36 is illustrated. The pressure relief panel 36 includes at least one integral flap 38, defined by a plurality of slots 40 and covering an opening 58 defined within the panel 36. The flaps 38 are dimensioned and configured to bend outwards in response to pressure from below the pressure relief panel 36. The slots are thin enough to maintain the integrity of the cabinet, and prevent objects such as tools, fingers, etc. from entering the cabinet. A preferred width of the slots 40 is less than 1/64 inch.

The number and configuration of flaps 38, and the material and thickness of the pressure relief panel 36, are selected to maximize the probability that an expected pressure level inside the cabinet 12 will push the flaps 38 into an orientation wherein the flaps 38 may best direct pressurized, heated gases exiting the cabinet 12 away from personnel working around the cabinet 12. One preferred material includes steel, such as 14-gauge steel. Referring to FIGS. 3–10, several alternative embodiments of the pressure relief panel 36 are illustrated. All embodiments of the pressure relief panel 36 are referred to simply by the number 36, whereas specific embodiments of the pressure relief panel 36, and elements therein are referred to by the reference number followed by a letter. Embodiments 36a–36h thereby include flaps 38a–36h, defined by slots 48a–48h. The illustrated embodiments include some examples of the numerous ways that the number and configuration of flaps 38 within the pressure relief panel 36 may be selected to best direct the exiting gases away from personnel.

Figure 11:
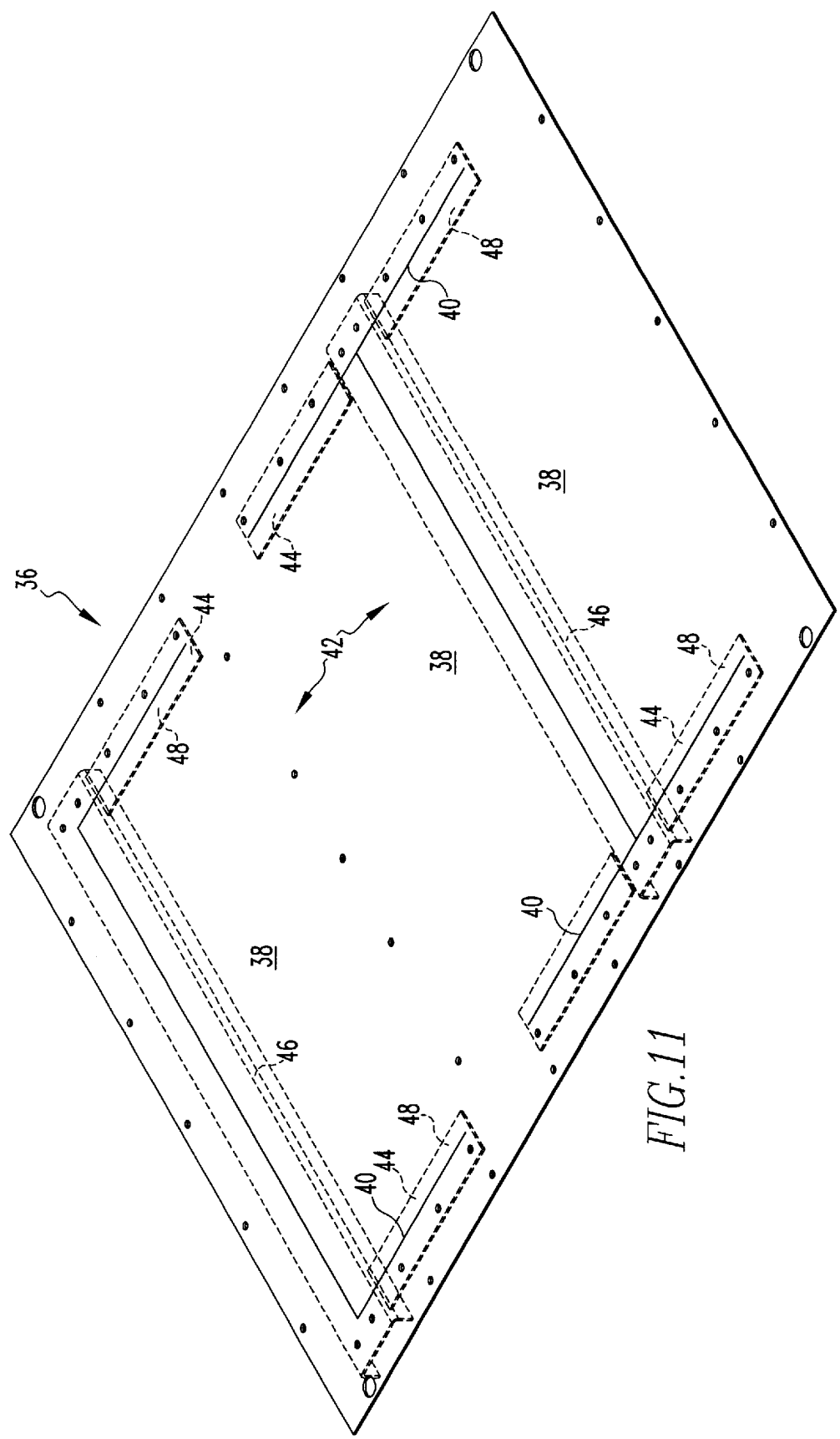
FIG. 11 is a top isometric view of a ceiling panel and associated lower braces for an arc resistant cabinet according to the present invention.
Figure 12:
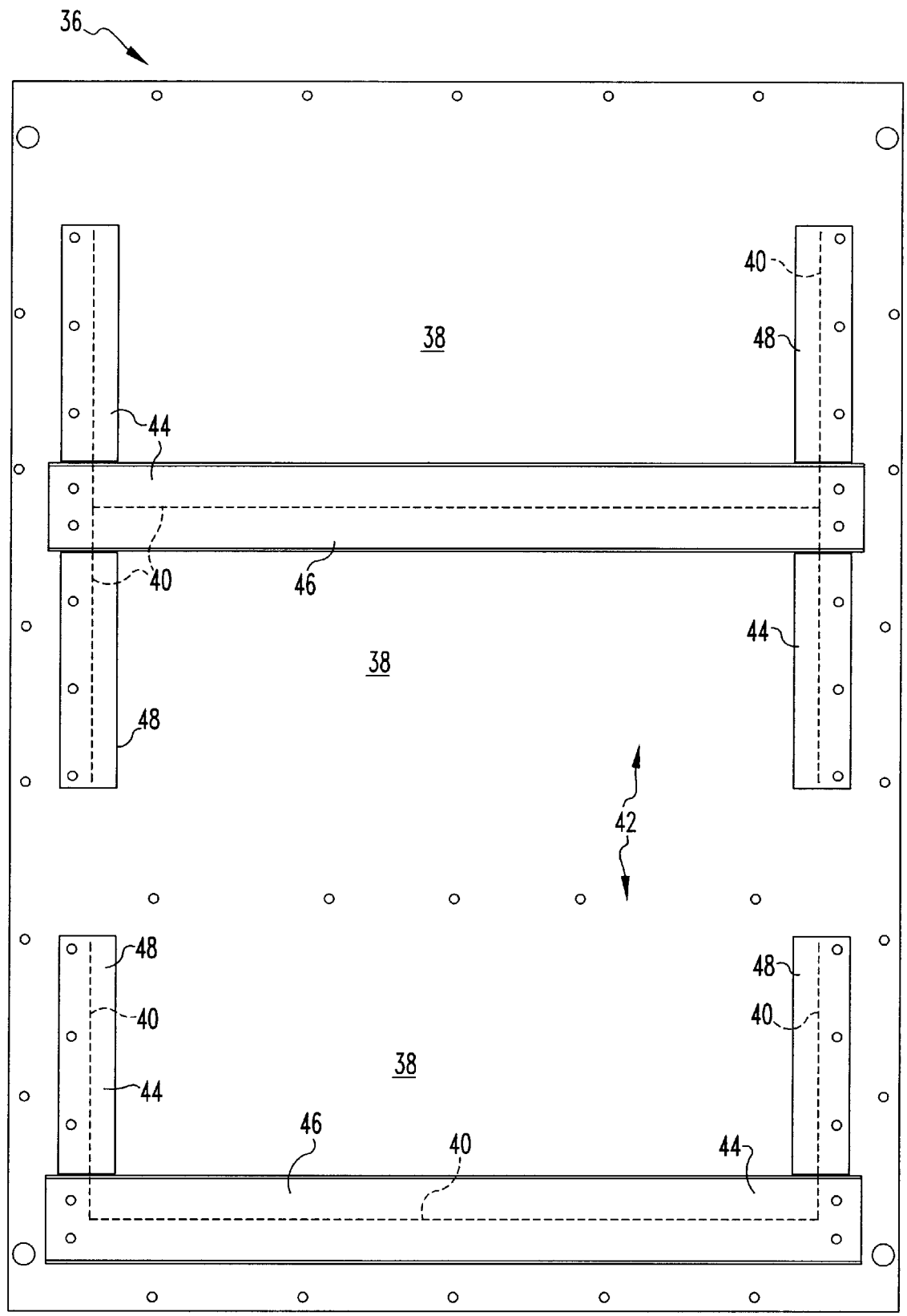
FIG. 12 is a bottom view of a ceiling panel and associated lower braces for an arc resistant cabinet according to the present invention.

Referring to FIGS. 11 and 12, the means for resisting downward movement of the flap 38 are illustrated. These means include the support structure 42, having a plurality of support beams 44 secured to the panel 36, under the flaps 38, although other configurations are possible. Preferred configuration of the support structure 42 includes at least one end beam 46 extending between a pair of side beams 48, with the end beam 46 and side beams 48 directly underneath and substantially parallel to the slots 40 defining the flap 38. Such a configuration has the additional advantage of preventing foreign objects from entering the cabinet 12 by blocking the slots 40. Preferred methods of securing the support beams 44 to the panel 36 include bolting the support beams to the panel, and welding the support beams 44 to the panel 36.

Figure 13:
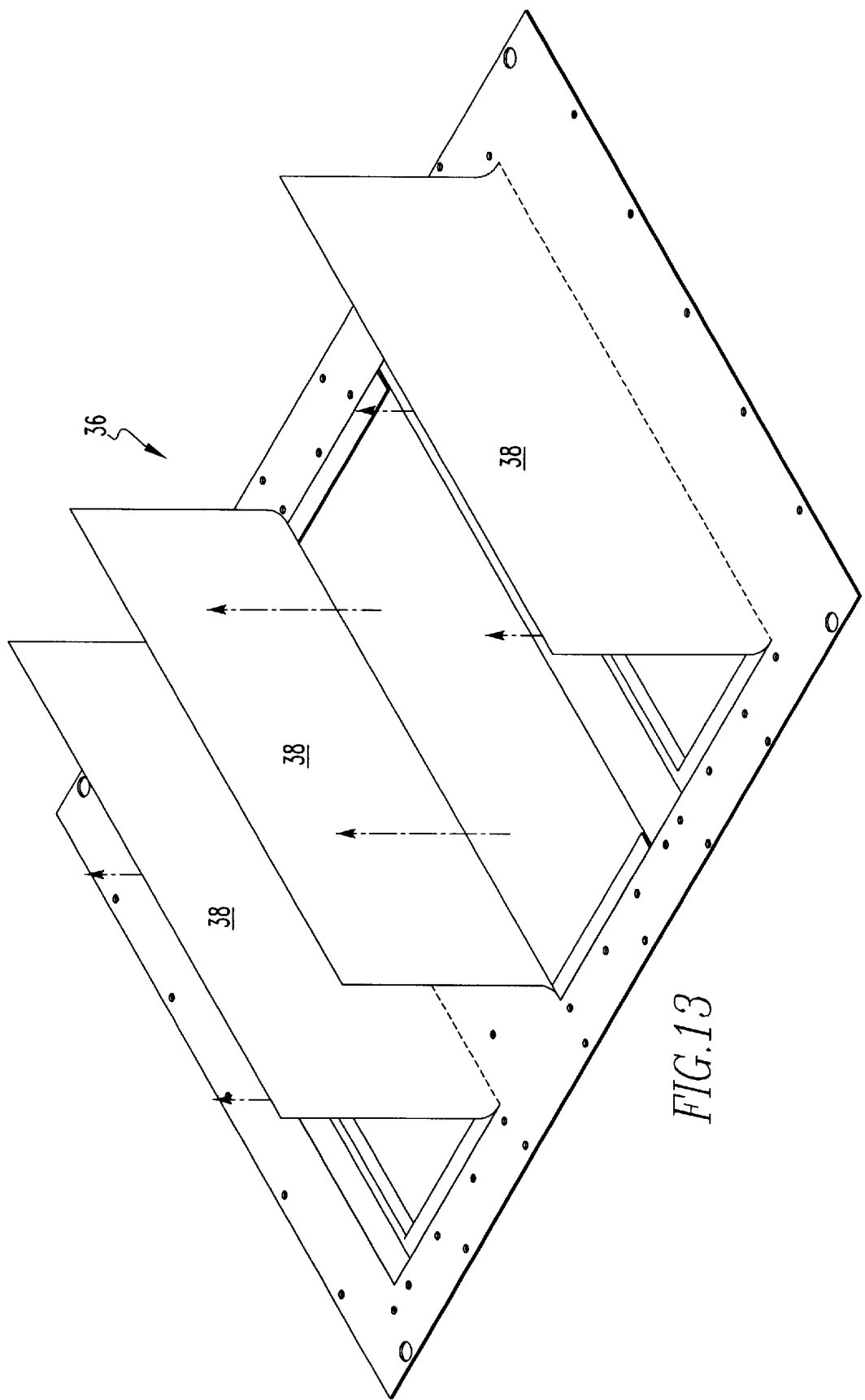
FIG. 13 is a top isometric view of a ceiling panel for an arc resistant cabinet of the present invention, showing the position of the flaps after an arc has occurred.

Referring to FIGS. 1 and 13 the operation of a pressure relief panel 36 in conjunction with an arc resistant cabinet 12 is illustrated. The pressure relief panels 36 will typically be installed in the ceiling 50 of the arc resistant cabinet 12. During installation of the pressure relief panels 36, and during normal use of the circuit breaker 14, the flaps 38 will be in their original, closed position of FIG. 3. The support structure 42 will permit personnel to safely walk across the flaps 38 without the flaps 38 bending inward, preventing personnel from falling into the cabinet 12.

In the event of an electrical arc 52, which is most likely to occur in the front compartment 60 pressure relief panels 36 will operate in conjunction with internal pressure relief panels 54 and ventilation flaps 56 (FIG. 2) to direct the resulting high temperature, expanding gases away from locations where personnel are likely to be present. The internal pressure relief panels 54 are weakened, thereby permitting them to fail before other components within the cabinet 12 fail. The expanding gases push the ventilation flap 56 closed, ensuring that none of the expanding gases exit through the front 34 of the cabinet 12, where personnel are likely to be located. At the same time, the expanding gases push the internal pressure relief panel 54*a* open, permitting the expanding gases to move through the opening previously covered by the panel 54*a*. The expanding gases is next directed upward, pushing the panel 54*b* open, finally reaching the ceiling 50 of the cabinet 12. The expanding gas then pushes the flap 38 from the position of FIG. 2 to the position of FIG. 13. As the expanding gas exits the cabinet 12 through the opening 58, previously covered by the flaps 38, the flaps 38 are pushed into a vertical orientation, wherein the flaps 38 continue to direct the expanding gas upward after it has left the cabinet 12. This additional upward travel of the expanding gas provides additional time for the gas to cool before it reaches area where personnel are likely to be present, thereby minimizing the potential for serious injuries.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A pressure relief panel, comprising:

a top surface and a bottom surface;

at least one integral flap defined within said pressure relief panel, said flap being dimensioned and configured to bend upward in response to pressure exerted on said bottom surface; and means for resisting downward movement of said flap.

2. The pressure relief panel according to claim 1, wherein said flap is dimensioned and configured to assume a substantially vertical orientation in response to pressure exerted on said bottom surface.

3. The pressure relief panel according to claim 1, wherein said panel is made from steel.

4. The pressure relief panel according to claim 3, wherein said panel is made from 14 gauge steel.

5. The pressure relief panel according to claim 1, wherein said at least one flap includes at least a pair of flaps, secured to said pressure relief panel on opposing sides of an opening defined within said panel when said flaps are in an open position.

6. A pressure relief panel, comprising:

a top surface and a bottom surface;

at least one integral flap defined within said pressure relief panel, said flap being dimensioned and configure to bend upward in response to pressure exerted on said bottom surface; and means for resisting downward movement of said flap, wherein said means for resisting downward movement of said flap is a support structure secured to said bottom surface.

7. The pressure relief panel according to claim 6, wherein:

said at least one flap is defined by a plurality of interconnected slots in said pressure relief panel; and said support structure includes a plurality of beams, with each of said beams secured beneath and substantially aligned with said slots.

8. An arc-resistant cabinet, comprising:

at least one pressure relief panel, comprising:

a top surface and a bottom surface;

at least one integral flap defined within said pressure relief panel; said flap being dimensioned and configured to bend upward in response to pressure exerted on said bottom surface; and means for resisting downward movement of said flap.

9. The arc-resistant cabinet according to claim 8, wherein said flap is dimensioned and configured to assume a substantially vertical orientation in response to pressure exerted on said bottom surface.

10. The arc-resistant cabinet according to claim 8, wherein said panel is made from steel.

11. The arc-resistant cabinet according to claim 10, wherein said panel is made from 14 gauge steel.

12. The arc-resistant cabinet according to claim 8, wherein said at least one flap includes at least a pair of flaps, secured to said pressure relief panel on opposing sides of an opening defined within said panel when said flaps are in an open position.

13. An arc-resistant cabinet, comprising:

at least one pressure relief panel, comprising:

a top surface and a bottom surface;

at least one integral flap defined within said pressure relief panel; said flap being dimensioned and configured to bend upward in response to pressure exerted on said bottom surface; and means for resisting downward movement of said flap; wherein said means for resisting downward movement of said flap is a support structure secured to said bottom surface.

14. The arc-resistant cabinet according to claim 13, wherein:

said at least one flap is defined by a plurality of interconnected slots in said pressure relief panel; and said support structure includes a plurality of beams, with each of said beams secured beneath and substantially parallel to said slots.

* * * * *